Patented May 22, 1951

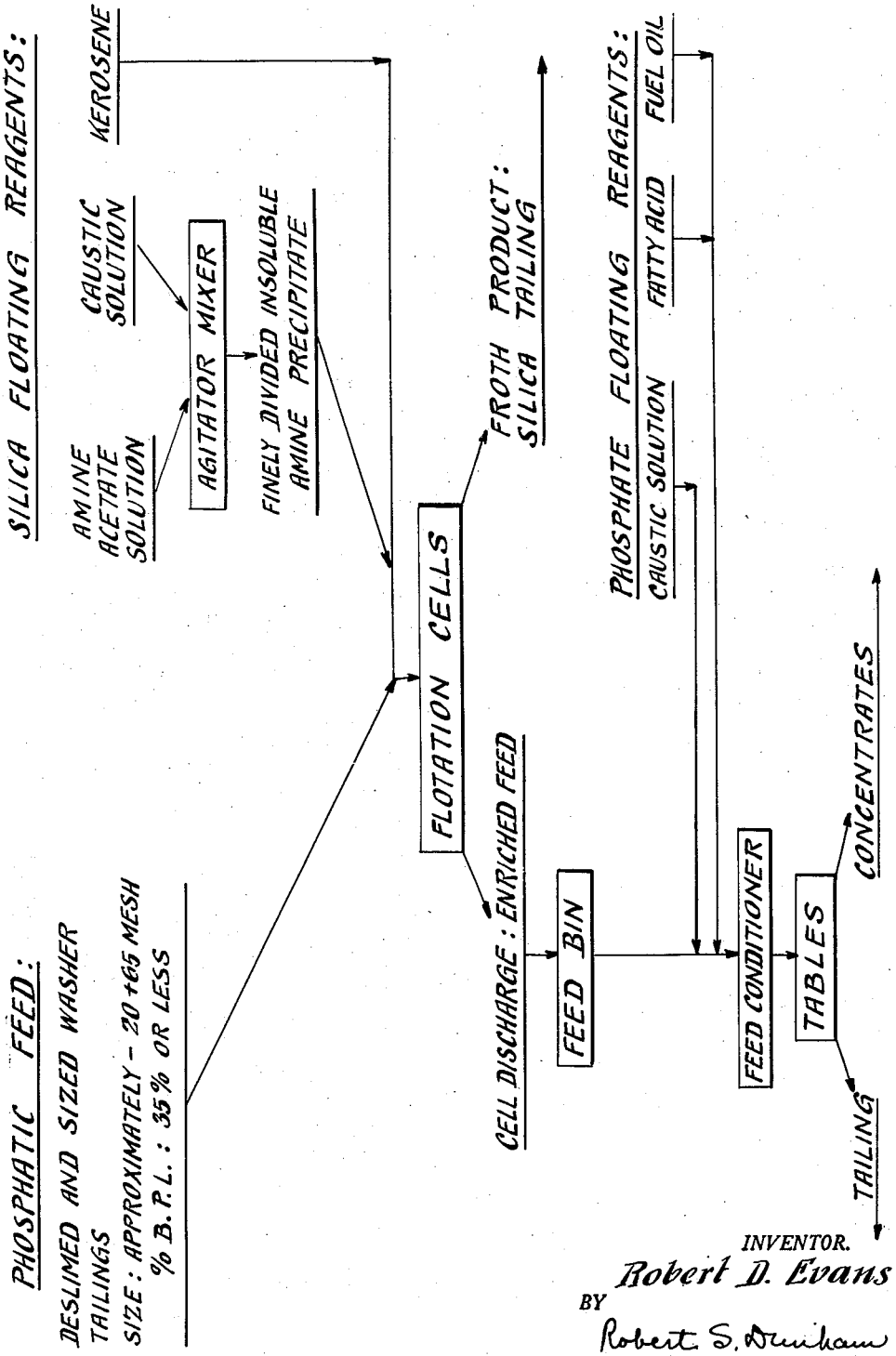

2,553,905

UNITED STATES PATENT OFFICE 2,553,905

CONCENTRATION OF PHOSPHATE MINERALS

Robert D. Evans, Pierce, Fla., assignor to American Agricultural Chemical Company, New York, N. Y., a corporation of Delaware Application December 6, 1946, Serial No. 714,659

17 Claims. (Cl. 209—12)

This invention relates to the concentration of phosphate mineral and particularly to operations for the ultimate separation of a high grade phosphate material from suitable ore by wet concentration procedure. Over a considerable time, various wet methods, including flotation, or tabling, as by Wilfley, Deister or other concentrating tables, have been proposed for the recovery of phosphate from ores containing it, and such procedures have been widely used, but only within rather severe economic limitations. Mineral phosphate is a material that must be produced in large quantities and at a low cost, and whereas in the concentration of many metalliferous ores flotation methods may constitute the only commercially feasible type of operation and minor differences of cost among such methods may thus be of small consequence, a great amount of phosphate has always been produced, e. g. as pebbles or lumps of high grade mineral, by relatively simple washing and screening. If flotation, for instance, is to be used for the finer fraction of the ore, the problem is not merely one of choice among alternative flotation methods or reagents specially adapted for phosphate concentration, but also requires study of its cost in relation to the inexpensive recovery of the coarser fraction. Thus in several aspects, the cost of a flotation or tabling process for phosphate is critical; a small additional expense for reagents, even though accompanied by improvement in grade or recovery of the product, may often be commercially prohibitive when the other economic factors are considered.

By way of example, in the usual hydraulic method of mining phosphate, e. g. so-called Florida pebble phosphate, the overburden of earth is first removed to expose the banks of ore, which is then removed hydraulically. The resulting slurry is treated in a phosphate washer for direct recovery of the larger sizes of the desired mineral, and the washer tailings, after suitable screening, settling, thickening or other procedures, can then be subjected to a wet concentration process to whatever extent may be commercially feasible. Appropriately disintegrated masses of phosphate ore resulting from other types of mining, such as so-called dry mining, may also be concentrated by wet methods, and in similar fashion the phosphate debris removed after long periods from settling ponds for washer waste can sometimes be reclaimed, so to speak, by the use of flotation or tabling. In every case, the expense of any such concentration requires very careful attention as explained above, including critical consideration of the ultimate cost per ton of recovered phosphate material having a commercially desirable grade, e. g. having a B. P. L. (bone phosphate of lime) content better than, say, 70 per cent and preferably upwards of 75 per cent.

While certain pre-eminent features of the present invention reside in improved methods of treating phosphate ore by flotation to separate silicious impurities, and likewise involve improvements in flotation reagents for such procedure, a particularly important specific aspect of the invention has to do with improved combinations of operations for treating phosphate ore to afford recovery of increased quantities of desirable phosphate from a given ore supply, with an economy of reagent, of equipment, and of other items of cost in plant operation. Objects of the invention thus include the attainment of these aims and of improved results in various combined procedures, as well as improvements in specific steps or groups of steps in such operations, useful in the combined methods or independently, e. g. as will hereinafter appear.

By way of example of one practical application of which the present invention is susceptible, reference will be made to the treatment of a phosphate ore of the Florida pebble type, mined in the vicinity of Boyette, Florida, by the hydraulic method. While this material is fairly representative of phosphate ore from other mining regions, particularly in Florida, it will be understood that the improved methods or steps hereinbelow described can be advantageously applied to any of a wide variety of impure phosphate bearing bodies, mined by various procedures; and by the same token it is believed that the following illustrative description of the treatment of Boyette ore will serve by way of example to explain the nature and principles of the invention.

As in many other cases, the material to be handled in the Boyette operation consists of tailings from the washer plant, having a particle size of less than $\frac{3}{32}$ inch. These tailings, which are chiefly the recovered sediment of settling tanks in the washer and from which a considerable amount of very fine material has already been removed, include a range of particle sizes down to somewhat less than 150 mesh, the —150 mesh material amounting to about 3 per cent of the total by weight. Under these circumstances and with the B. P. L. content of the ore decreasing with decrease of particle size, a tabling operation on a selected fraction of the material would ordinarily seem to be the desirable procedure for concentration. In the specific case the —35 mesh material was of distinctly poorer grade than the fraction, relatively small in amount, that ranged from $-\frac{1}{32}$ inch to $+35$ mesh, and reasons of economy appeared to permit tabling of the latter fraction only, the $-35$ mesh portion being entirely discarded although it actually contained much more phosphate. Use of the finer portion would require either a disproportionately large tabling plant, or would so overload the tables as to ruin the grade of the resulting concentrate. So far as could be ascertained from prior understanding of the art, any possible supplementary treatments would be unduly expensive, even if they could in fact contribute to the attainment of a satisfactory product; one or more of such matters as supplementary reagent costs, a requirement of special treatment to remove the effect of one reagent before employing a different one, and the relative inefficiency of known types of additional steps, appeared to prohibit any operation beyond the simple tabling of a selected, coarser fraction of the material.

In accordance with my present discoveries, however, an improved procedure has now been found applicable to situations of the sort described, whereby in a given plant the total amount of feed may be greatly increased, i. e. to include finer mesh material, and a larger quantity of high grade concentrate may be produced. At the same time, the tabling equipment is used more efficiently, and although another step is employed, relatively little additional apparatus is needed and the extra cost for reagent materials is comparatively small, so that the total increased production of phosphate is economically justified.

I have found that this increased tonnage may be most efficiently obtained, not by substituting a flotation operation or even a series of different flotation steps for a tabling operation, nor by subjecting the table concentrate to a subsequent treatment, but by a novel process combining the tabling step with a preliminary silica flotation which not only removes a large amount of the impurities but also permits the utilization of the finer sized, poorer grade fraction, i. e. so that the feed to the system may include rather than discard this large body of material which actually contains a very large quantity of valuable phosphate. Silica flotation, as by the use of amine reagents, has previously been proposed as a sole recovery operation or in certain other combinations involving phosphate concentration, but there has been no realization, so far as I am aware, of the peculiar advantages of the novel procedure hereinbelow described; moreover, the amines heretofore used as reagents for silica flotation are high-priced chemicals, required to be employed in relatively considerable amounts per ton of feed. It should be particularly noted that an important and preferred feature of my improved procedure involves a novel treatment or preparation of reagent materials and mode of utilizing the latter in flotation, whereby a remarkable efficiency, from the standpoint of reagent cost as well as otherwise, is achieved.

More specifically, for instance, the new procedure involves establishing a deslimed or effectively slime-free pulp of the feed, e. g. washer tailings, which may include considerably finer particle sizes than might otherwise be used for a table feed, introducing into the pulp a reagent, preferably prepared immediately prior to such introduction by mixing together solutions of a water soluble amine salt and a substance such as caustic soda to react therewith as hereinbelow explained, then immediately (and without any intermediate treatment) subjecting the pulp to flotation operation in a flotation unit, whereby silicious material, e. g. sand, is separated in a remarkably large quantity by floating it away from the phosphate. Thereupon the non-floated material is employed as feed to a tabling plant of the usual sort, after introduction of reagents appropriate for tabling but without need for special intermediate treatment, and the tabling operation is carried along in the customary manner. The final concentrate, coming over the side of the table, is found to have a desirably high B. P. L. content and to be the equivalent of the output of a tabling plant which, without the new preliminary treatment, would have to accommodate a great deal more actual table feed and yet, even then, would be using only a fraction comprising larger particle sizes, screened from material that can in effect be reclaimed in its entirety by the present, improved process.

It is believed that several factors contribute to the unusual efficiency of the preferred combination of steps. The first factor involves the preparation and use of the reagent for the silica flotation, whereby a costly type of substance, of which octadecyl amine acetate appears at present to be an example remarkably suited for my purpose, is converted into a material or condition such that small quantities are effective to produce a rapid and large float of sand. As explained more fully below, my present process differs in character from the simple introduction of an amine or amine salt for silica flotation in an alkaline pulp, and from other proposals, such as for concentrating phosphate with silica flotation alone by assertedly inhibiting ionization of certain cationic reagents.

The original pulp ought preferably to be well deslimed before flotation reagents are added, or at least to be effectively slime-free, i. e. having an absence of slimes that is produced by desliming or that is equivalent (whether inherently or as a result of other operations) to an absence of slimes so produced. Further advantageous features of the process reside in economies due to the omission of any conditioning or the like in the pulp before the flotation step, and to the omission of any reagent-removing treatment prior to tabling; not only have such operations been found unnecessary, but tests with the Boyette pulp, for example, have indicated that "conditioning" it by agitation in the presence of the special amine reagent can almost completely prevent the subsequent silica flotation that would otherwise be obtained.

Another factor believed to be important is the peculiar cooperation between the tabling operation and the preliminary improvement of the pulp by separating a large silica float. Not only is the table feed greatly enhanced in grade and the final product similarly improved as to quality or recovery, but as indicated above there is effective utilization of a kind of feed different (e. g. different in characteristics of both particle size and grade) from that to which a tabling plant would usually be limited for any practical purpose.

For instance, with the Boyette ore mentioned above, tests have shown that if the material classified as $-\frac{1}{32}$ inch to $+65$ mesh (about 26 per cent B. P. L.) is subjected, in accordance with my process, first to silica flotation and then to tabling in a tabling plant which has a capacity of 36 tons of feed per hour and which is operated in the process at that feed rate, the system will yield from about 17 to 20 tons per hour, of a final concentrate grading 75 to 80 per cent B. P. L. But if the preliminary step is omitted and the table plant is supplied with 36 tons per hour of similar original material ($-\frac{1}{32}$ inch to $+65$ mesh), it will only yield about 8.6 tons per hour (or a maximum of about 200 tons in 24 hours) of concentrate containing about 74 per cent B. P. L. Thus although the tabling plant is operated at capacity per hour in each instance, the improved process not only permits a large increase in actual amount of material handled, but can yield more than twice as much concentrate per hour, of an even better grade.

Economically, considering all cost factors of the circumstances of the Boyette operations, what may be the only practical comparison of the improved process with a straight tabling method is in the case where the feed to the latter is of a different kind, e. g. is limited to material having the size range $-\frac{1}{32}$ inch to $+35$ mesh, which has, from the washer tailings at Boyette, a B. P. L. content of about 43 per cent. Operated at capacity of 36 tons per hour of such feed, the tabling plant yields about 15 tons of concentrate per hour assaying 77 per cent B. P. L., not only a smaller production by comparison, but one involving a great waste of valuable ore, i. e. in the discarded $-35$ mesh to $+65$ mesh material. The actual quantitative comparison, based on available ore, is very great, since in order to produce the 15 tons of concentrate by the last-mentioned tabling operation, 118 tons of the original $-\frac{1}{32}$ inch to $+65$ mesh material are used or wasted (there being 82 tons of $-35$ mesh for each 36 tons of $+35$ mesh), whereas only 65 to 85 tons of that material are used, and completely used, in producing 17 to 20 tons of concentrate by my improved process, with the tabling plant operated at its capacity per hour in each instance. Or, assuming that 1500 tons of the $-\frac{1}{32}$ inch to $+65$ mesh material are available per day, and computing from figures derived from actual test results, straight tabling (on $+35$ mesh feed) will yield about 195 tons per day of concentrate whereas the improved process can yield up to about 390 tons per day—twice as much.

In the new method of preparing and employing an amine-type reagent the essential discovery is that by treating a solution of an amine salt with caustic soda or other material of similar reactive effect and then introducing the resulting mixture into the pulp in the flotation cell, an immediate, voluminous sand float is obtained, carrying very little phosphate and leaving a phosphate-enriched, non-floated portion. To advantage in most cases kerosene or the like may be used as a cooperating collector, e. g. by adding it to the reagent mixture. According to present belief, the caustic reaction converts the soluble amine to an insoluble form in a fine and peculiarly efficacious state of dispersion, which should preferably not be disturbed. Even long standing seems to change the precipitate to a more dense or massive form having impaired flotation properties, no more effective than ordinary free base, i. e. water-insoluble, amines, though probably still better than water-soluble amine salts.

The drawing represents a flow sheet illustrating the invention as applied in a practical form for concentration of phosphate mineral.

The following is a description of specific examples of my combined procedure applied to the treatment of phosphate ore at Boyette, Florida. Two sources of ore samples were employed: Sample type I from deposits of so-called debris from a phosphate washer that had been operating to recover $+\frac{1}{32}$ inch mineral while thus discarding the finer material; sample type II from ore (including the pebble sizes) excavated in another area at Boyette, i. e. a future washer feed. In each case the material was screened or treated to remove particles larger than 20 mesh ($\frac{1}{32}$ inch) and finer than 65 mesh, and also so as to render the resulting $-20$ mesh to $+65$ mesh material substantially slime-free, as explained hereinabove; in all other respects the samples were exactly as removed or mined from the sources stated.

Screening tests and analysis of random specimens of the samples revealed the following characteristics, particularly as to various particle size fractions:

TABLE 1

| Particle size fraction (mesh) | Sample Type I (random specimen) | | Sample Type II (random specimen) | |
|---|---|---|---|---|
| | Per cent of total wt. | Grade: Per cent B. P. L. | Per cent of total wt. | Grade: Per cent B. P. L. |
| $-20$ to $+35$ | 25.9 | 36.03 | 29.3 | 45.31 |
| $-35$ to $+48$ | 30.4 | 20.82 | 31.6 | 21.74 |
| $-48$ to $+65$ | 43.7 | 23.12 | 39.1 | 22.08 |
| entire: $-20$ to $+65$ | 100.0 | 25.9 | 100.0 | 28.8 |

The operations included not only tests of the improved method on samples having an approximate particle size of $-\frac{1}{32}$ inch to $+65$ mesh, but comparative tests involving a tabling operation alone on a like sample and also on screened fractions having a size range of $-\frac{1}{32}$ inch to $+35$ mesh, which as explained above had previously been considered the only fraction that could be economically concentrated. In making the tests involving tabling alone, standard tabling procedure was followed and the table feed was treated with the necessary reagents in a drum type (bucket) mixer. The tabling reagents were tall oil (fatty acid), fuel oil, and a small quantity of sodium hydroxide. A table of the Wilfley type was used.

In the tests employing silica flotation in accordance with my improved procedure, the feed was established as a pulp comprising approximately 12 per cent solids by weight. The reagents used were a soluble amine acetate, identified as octadecyl amine acetate, manufactured and sold by Armour & Company, carrying the designation AMAC–1180–C, and sodium hydroxide. The amine acetate was made up as a 2½ per cent (by weight) solution in water and the caustic in a solution containing 44.6 grams of sodium hydroxide per liter. A small quantity of kerosene was also employed, for better flotation as explained above. The amine and caustic solutions were rapidly mixed together, the kerosene was added to the mixture and the whole was immediately washed into the flotation cell in which the feed pulp had already been introduced. No mixing or conditioning of the pulp, i. e. with respect to the introduced reagents, was employed at all. The flotation cell unit comprised a machine of the Fagergren type which was set in operation at least as soon as the introduction of the reagents.

In all cases an immediate, fast float occurred, with approximately half of the weight of the total sample, i. e. of its solids content, being carried over in the froth. After removal of the froth, which was found to consist principally of silica, the pulp remaining in the flotation cell was treated with the regular oil reagents and subjected to tabling, exactly as described above in reference to the tests employing tabling alone. The enriched material discharged from the flotation cell received no washing or other treatment to remove the silica flotation reagents. The following table sets forth the results of these tests, including amounts of reagent expressed as pounds per ton of the original (dry) feed, and also including analyses of the B. P. L. content and recovery of the various concentrates, tailings or intermediate products. Here and throughout this specification references to tons mean long tons (2240 pounds) unless otherwise stated.

and economy of a tabling operation decreases as such ratio rises above 2 or so. In each case the new process provided an increase of the tabling concentrate tonnage by condensing the feed, so to speak, and raising its B. P. L., without losing the B. P. L. units in the finer sizes and without contaminating the final product with fine silica. Indeed the grade of the product increases with the amount of silica floated from the feed; but in any event the finer sand floats first, leaving only the coarser size, which is less likely to contaminate the final concentrate.

When the improved reagent preparation is used, the caustic soda or the like and the soluble amine salt should be reacted before either is added to the phosphate pulp. In all successful tests made,

TABLE 2

| Source of test sample | Sample Type I | | | Sample Type II | | |
|---|---|---|---|---|---|---|
| Designation | (a) | (b) | (c) | (d) | (e) | (f) |
| Feed size: −1/32 inch to | +35 M (1) | +65 M (1) | +65 M (2) | +35 M (1) | +65 M (2) | +65 M (2) |
| Recovery type | | | | | | |
| Total reagents, lbs./ton of orig. feed: | | | | | | |
| Amine ac | | | 0.076 | | 0.079 | 0.115 |
| NaOH | 0.79 | 0.50 | 0.77 | 0.86 | 0.80 | 0.92 |
| Fatty acid | 1.45 | 1.08 | 1.35 | 2.02 | 1.56 | 1.79 |
| Fuel oil | 1.45 | 2.42 | 1.35 | 2.02 | 1.56 | 1.79 |
| Original feed Per Cent B. P. L | 37.74 | 25.90 | 26.28 | 42.92 | 26.25 | 26.65 |
| Silica float, Per Cent weight | | | 52.08 | | 44.82 | 57.64 |
| Assay, Per Cent B. P. L | | | 4.60 | | 3.45 | 4.26 |
| Table feed, Per Cent weight | 100.00 | 100.00 | 47.92 | 100.00 | 55.18 | 42.36 |
| Grade, Per Cent B. P. L | 37.74 | 25.90 | 49.84 | 42.92 | 44.77 | 57.12 |
| Table Concent., Per Cent weight orig. feed | 37.50 | 23.76 | 25.31 | 42.64 | 25.93 | 23.49 |
| Grade, Per Cent B. P. L | 75.10 | 73.95 | 78.20 | 77.17 | 75.36 | 80.27 |
| Per Cent Insol | 5.88 | 7.76 | 4.93 | 5.14 | 7.50 | 4.06 |
| Table Middlings, Per Cent weight orig. feed | 1.97 | (3) | 0.58 | 3.25 | 1.91 | 1.03 |
| Grade, Per Cent B. P. L | 55.09 | | 54.40 | 55.32 | 55.20 | 58.42 |
| Table Tailings, Per Cent weight orig. feed | 62.53 | 76.24 | 22.03 | 54.11 | 27.34 | 17.84 |
| Assay, Per Cent B. P. L | 15.99 | 10.93 | 17.14 | 15.18 | 14.84 | 26.57 |
| Ratio, Orig. feed/Concent | 2.82 | 4.21 | 3.95 | 2.35 | 3.86 | 4.26 |
| Ratio, Table feed/Concent | 2.82 | 4.21 | 1.89 | 2.35 | 2.13 | 1.80 |
| Per Cent B. P. L. recovered from orig. feed | 70.64 | 67.84 | 75.31 | 76.67 | 74.64 | 70.75 |

1 Table only.  2 Flotation and table.  3 Negligible-Combined with tailings.

It will be observed that the improved process, as represented by tests (c), (e) and (f), provided a recovery ranging up to 75 per cent of the phosphate content of the original feed, and yielded a final concentrate having an assay of 75 to 80 per cent B. P. L. Whereas the recovery in the case of tabling operations alone on the −1/32 inch to +35 mesh material—tests (a) and (d)—was comparable, and likewise the assay of the concentrate, it must be remembered that these operations used only a selected fraction of the available feed, having a relatively high grade as shown in Table 1, and thus represented a large waste of valuable phosphate mineral in the −35 mesh to +65 mesh size.

Although test (b) employed a feed of the entire size range, the effective recovery of phosphate was materially less, and the grade of the concentrate was also distinctly lower than in tests (c), (e) and (f), while the amount of reagents required for the tabling was much greater. Since the capacity of a table is in practice limited to a certain maximum per hour regardless of feed characteristics, test (b) lacked another advantage of the combined process, namely a great effective increase in the tonnage capacity of a system embodying a given tabling plant. The feed-to-concentrate ratio for tabling was desirably low in tests (c), (e) and (f); the efficiency the reaction produced an appreciable precipitate, understood to be an insoluble amine material, i. e. a free base amine or an insoluble amine salt; its peculiarly fine subdivision seems to be largely responsible for the superior properties, distinguishing it from previously proposed emulsions or other mixtures of free base amines. Other reactants than caustic soda may be used, indeed apparently any substance capable of producing the described precipitate.

Examples of a variety of suitable reactants, including alkali hydroxides, oxygen-containing mineral acids, sulfates and carbonates, are set forth in the following Table 3, which was prepared from a series of tests. In each instance, the primary reagent used was octadecyl amine acetate (Armour's 1180-C, as above), employed as a 2½ per cent solution in water. The phosphate ore feed for each test was 500 grams, dry weight, of Boyette deslimed debris like sample type I above, and the procedure was: to establish a pulp of the feed, say 15 per cent solids, in the Fagergren flotation cell, the solids content later falling to about 12 per cent when the reagent is washed into the pulp; then to combine the selected chemical, in the amount stated below as required for producing a reaction, with 0.5 cc. of the amine acetate solution (the amine acetate thus being used in the proportion of 0.056 pound per ton of feed), and to wash the resulting precipitate-containing mixture into the pulp in the flotation cell. Operation of the cell in each case produced a rapid float and in view of knowledge derived from experience in previous analyzed tests, namely that such a float represented the desired separation of silica, numerical results sufficiently indicative for comparison were obtained simply by measuring the dry weight of the material floated.

TABLE 3

| Reagent combined with amine solution | | | Grams floated, as silica |
|---|---|---|---|
| Formula | Added as— | Amount | |
| None | (Comparison test—amine acetate alone). | | 7 |
| | | Drops | |
| NaOH | 5% solution | 2 | 116 |
| KOH | do | 2 | 130 |
| NH₄OH | 13% solution | 2 | 151 |
| H₂SO₄ | 10% solution | 2 | 120 |
| H₃PO₄ | do | 13 | 75 |
| K₂SO₄ | 5% solution | 2 | 100 |
| CuSO₄ | do | 2 | 101 |
| Na₂SO₄ | do | 2 | 75 |
| MnSO₄ | do | 2 | 103 |
| FeSO₄(NH₄)₂SO₄ | do | 2 | 92 |
| Na₂CO₃ | do | 3 | 133 |
| NaHCO₃ | do | 5 | 83 |
| None | (Check test—amine acetate alone). | | 4 |
| | | Drops | |
| NaOH kerosene added | 5% solution | 2 2 | } 166 |
| NH₄OH kerosene added | 13% solution | 2 2 | } 175 |

The last two tests in this series show the advantage of including a supplemental collector such as kerosene. Some compounds, such as hydrochloric acid, other chlorides, bromides, iodides and nitrates, which would presumably produce only soluble products upon reaction with the amine salt, were found to be ineffective as reactants in tests like those enumerated above. Likewise poorly soluble substances such as barium hydroxide were relatively ineffectual. Another group of materials, including potassium bicarbonate, and potassium and ammonium oxalates, yielded only moderately useful results, e. g. from 45 to 60 grams of float.

In general it was found that among the materials tested the alkali metal hydroxides, and likewise sodium carbonate, which is a strongly alkaline substance, and also sulfuric acid and some of the sulfates, afforded best results. Very likely there are other substances than those specifically named that could be employed; it is obviously impractical to make and report herein an examination of all conceivably useful chemicals, but in view of this disclosure, such examination to determine the utility of any substance as a reactant, even under specific conditions of feed or the like, is merely a matter of simple test following such routine as is explained in connection with Table 3. By way of interpretation of the indicated type of test, it appears that if the reagent combination utilizing the substance under test will produce, in a given feed and without supplemental collectors such as kerosene, a float comprising upwards of about 10 per cent of the feed, and preferably upwards of 20 per cent (especially where the feed is of a low grade, i. e. assaying less than about 30 per cent B. P. L.), a useful reactant is indicated.

Further investigation has shown that compound inorganic salts may also be used satisfactorily to produce the reaction with the soluble amine. For instance, in one test using 0.08 pound per ton of the amine acetate, to which was added 0.04 pound per ton of ammonium alum $(NH_4Al(SO_4)_2)$, the former in 2½ per cent and the latter in 5 per cent solution, 40 per cent of the feed was floated as silica. Yet another material found to be suitable for the reaction with amine salts is an aliphatic acid composition, known as Oronite Aliphatic Acid #100, a product of Oronite Chemical Company, of San Francisco, California. This product is understood to consist of a water solution of the sodium salts of organic carboxylic acids which are derived from petroleum and are a mixture of many isomeric carboxy acids having a molecular weight from about 90 to 200. The product may be used, either directly or with further dilution, in amount of 0.2 to 0.7 pound per ton of dry flotation feed, being mixed with a solution of amine acetate or amine hydrochloride as elsewhere described herein, to make the silica flotation reagent.

Salts of various amines may be employed in the improved procedures; for example, in one series of tests a number of differing, commercially available amine acetate compositions were used. In each test a 2½ per cent solution of the selected amine acetate was treated with a 5 per cent solution of reactant, which was sodium hydroxide except in one test where sulfuric acid was substituted, and the resulting precipitate bearing mixture was washed into the flotation cell containing a dilute feed pulp of low grade phosphate (about 23% B. P. L.). The amounts of reagent per ton of dry feed were: amine acetate 0.08 pound, sodium hydroxide about 0.05 to 0.07 pound, sulfuric acid 0.03 pound. Kerosene in amount of 0.45 pound per ton, and a supplemental frother known as H. T. P. B-23 alcohol, in amount of 0.07 pound per ton, were introduced separately into the flotation cell containing the feed and water.

The flotation operations were performed in the usual manner, and one group of 5 reagents, thus individually tested, were found to have yielded floats ranging from about 45 to 55 per cent of the original weight of the feed, as silica, while the cell discharges, i. e. the non-floated material, assayed from about 41.4 to 49.3 per cent B. P. L., representing a recovery of 94.5 to 96 per cent. Two other amine salt compositions, i. e. a second group tested in identical procedure, were found useful but somewhat less effective, as indicated by floats of 28-37 per cent and cell discharges assaying 30.5 to 35 per cent B. P. L., for a relatively high recovery of about 98 per cent. It was noted that the substitution of sulfuric acid or caustic soda, with one of the first group of reagents (Armour's AMAC–118.5–B)—such results being included in the summary above—somewhat reduced the weight of the float and the B. P. L. content of the discharge, e. g. from 53 to 45 per cent and from 46 to 41.4 per cent respectively.

All of the reagents thus tested were amine salt mixtures produced by Armour & Company, and are more particularly described in the following tabulation derived from Armour's data and identifying the reagents under the above-mentioned groups and individually by Armour's original and recently adopted names:

TABLE 4

Group 1

| Designation | Description |
|---|---|
| 12-NAMAC-1181.5-C (now Armac S) | Mixture of about 10 parts mono-n-octadecyl, 15 parts mono-n-hexadecyl and 75 parts mono-n-octadecenyl amine acetates, and octadecane, hexadecane and octadecene nitriles in same proportions. Product contains 75% primary amine acetates, based on average molecular weight of 324; remainder is nitriles. |
| AMAC-118.5-B (Armac TD) | Commercially pure mixture of about 25 parts mono-n-octadecyl, 25 parts mono-n-hexadecyl and 50 parts mono-n-octadecenyl amine acetates. |
| AMAC-118.5-C (Armac T) | Technically pure mixture of about 25 parts mono-n-octadecyl, 25 parts mono-n-hexadecyl and 50 parts mono-n-octadecenyl amine acetates. |
| AMAC-1160 (Armac 16D) | Commercially pure mono-n-hexadecyl amine acetate: 94 parts of same, plus 5 parts mono-n-octadecyl and about 1 part mono-n-octadecenyl amine acetates. |
| AMAC-1180-C (Armac HT) | Consists chiefly of octadecyl amine acetate. |

Group 2

| Designation | Description |
|---|---|
| AMAC-1120 (an equivalent material is now Armac 12). | Commercially pure dodecyl amine acetate: about 93 parts of same and about 4 parts tetradecyl and 3 parts decyl amine acetates. |
| AMAC-Coco-B (Armac CD) | Mixture of commercially pure amine acetates:<br>octyl, 8 parts<br>decyl, 7 parts<br>dodecyl, 48 parts<br>tetradecyl, 17½ parts<br>hexadecyl, 9 parts<br>octadecyl, 2 parts<br>octadecenyl, 6 parts<br>octadecadienyl, 2½ parts |

It will be seen that these materials include acetates of various aliphatic amines, both saturated and unsaturated, and including in some cases other amine-type materials. According to present understanding, acetates, hydrochlorides and other soluble salts of amines comprising 8 or more carbon atoms, and especially such salts of amines that include one or more carbon groups each containing from 8 to 22 carbon atoms, are useful for the preparation of flotation reagents of the character described herein; but definitely preferred results seem to have been obtained where the amine compound at least predominantly comprises material with one or more carbon groups each having 16 or more carbon atoms, examples being hexadecyl and octadecyl amine acetates, each of which includes a long alkyl chain. Although primary amines (in the form of their water-soluble salts) having an aliphatic group containing from 8 to 22 carbon atoms have been found by numerous tests to afford peculiarly and pre-eminently satisfactory results in my process, knowledge of the art with respect to the properties of so-called cationic type collectors or flotation reagents now indicates that if treated in accordance with the preferred procedure for reagent preparation as herein described, soluble compounds of secondary and other amines are usable, and likewise such compounds of various amines containing other groups such as cyclic groups. In all cases the soluble amine compound must be one which, when brought into contact with a cooperative soluble reactant of the kind described hereinabove (i. e. an alkali, sulfate, or the like), will produce a chemical reaction converting the amine material into a form which is so characterized, e. g. by relative insolubility and a peculiarly fine dispersion, as to constitute the reaction mixture a more effective silica flotation reagent than any of the original reactants thereof or any separated component thereof used alone or by separate introduction.

By way of comparison a free base amine, i. e. Armour's AM-1181.5-B (name recently changed to Armeen SD), understood to consist chiefly of hexadecyl and octadecyl amines, was tested in the same way and in the same amount, 0.08 pound per ton of feed, as the several acetates described above. No treatment with caustic was employed, since other tests had indicated that such treatment of free base amines is of no advantage, but the pulp was made alkaline by separately incorporating 0.084 pound of sodium hydroxide per ton, in accordance with prior recommendations for the use of an alkaline circuit. The flotation results were definitely inferior in comparison with the preferred procedure of the invention: only about 25 per cent of the feed was floated as silica, while the grade of the cell discharge (non-float) was only about 29 per cent B. P. L.

In fact other tests have shown that to obtain even moderately useful results in floating silica from phosphate with free base amines as commercially available, considerably larger amounts of the amine are usually necessary, e. g. 0.112 or more pounds per ton of feed; and even then, the results are unsatisfactory unless the amine is prepared as an emulsion or as a solution in an organic solvent. It will now be realized that under some conditions, especially if it is practical to forego the several advantages of my improved reagent preparation, the concentrate tonnage of a phosphate tabling plant may be improved by a preliminary silica flotation using simply a commercial amine, say of the free base type introduced (in the larger amount) as an emulsion or as a solution in denatured alcohol or other organic solvent; nevertheless, in all of the numerous comparative tests that I have made, a more effective removal of silica and a higher grade of cell discharge have been obtained when the preliminary flotation followed the preferred procedure herein disclosed, including the described reagent preparation made by reaction of an amine salt such as octadecyl amine acetate with a precipitating reactant, e. g. caustic soda. As explained elsewhere herein, use of the improved reagent also avoids serious problems of difficulty in handling and danger to personnel, that arise in ordinary use of free base amines.

As stated above, various salts of amines may be employed in carrying out the invention; for example, one composition used was a mixture of hexadecyl and octadecyl amine hydrochlorides, of a character understood to be equivalent to Armour's product designated AMCL-1180-B. Several tests were run to determine the effect of combining this material with caustic and other reagents and it was readily apparent that under preferred conditions the hydrochloride behaves similarly to the acetate. Adding 0.08 pound of the amine hydrochloride, without any treatment, and 0.45 pound of kerosene (all per ton of dry feed) to a dilute pulp and then operating the cell, only 2.0 per cent of the feed was floated as silica. When the same amount of amine hydrochloride was combined with 0.02 pound of caustic soda per ton, other conditions remaining constant, 47.4 per cent of the feed was floated as silica; upon substituting 0.02 pound of copper sulfate per ton for the caustic soda, 47.4 per cent of the feed was again floated. When the amine hydrochloride, sodium hydroxide and kerosene were added separately to the pulp, only 3 per cent of the feed was floated.

Additional operations with the hydrochloride were included in a series of tests performed to ascertain the value of a possible alternative procedure, namely that of separating the amine precipitate by filtration, washing it to remove excess caustic or acid, and then using the separated and washed material as the flotation reagent. Results of these tests are tabulated below; in each case the feed consisted of 500 grams of $-\frac{1}{32}$ inch material, deslimed over a 65 mesh screen, and from the same source as sample type II above. A Fagergren flotation machine was employed, and the reagent materials, listed as dry weight in the table, were used in the following strengths of aqueous solution: amine acetate (Armour's AMAC-118.5-B), 2½%; amine hydrochloride (as above, equivalent to Armour's AMCL-1180-B), 2½%; caustic soda, copper sulfate and sulfuric acid, 5% each. Kerosene amounting to 0.45 pound per ton of feed was used in each test, being the first substance introduced into the dilute pulp prior to flotation. In tests lettered "A" the precipitate was not washed or filtered, the entire product of the reagent combination being added directly to the feed pulp in the machine; in tests lettered "B" the amine precipitate was filtered and washed on filter paper, the residue on the paper being then washed into the feed pulp prior to flotation.

TABLE 5

| Test No. | Amine Used | Amine Reagent, Lbs./ton of feed | | | Precip. washed and filtered | Per cent of feed floated as silica |
|---|---|---|---|---|---|---|
| | | Amine | NaOH | H₂SO₄ | | |
| 1A | acet | 0.08 | 0.04 | | No | 60.8 |
| 1B | ---do--- | 0.08 | 0.04 | | Yes | 54.0 |
| 2A | ---do--- | 0.08 | | 0.03 | No | 55.6 |
| 2B | ---do--- | 0.08 | | 0.03 | Yes | 53.6 |
| 3A | hydrochl | 0.08 | 0.04 | | No | 63.8 |
| 3B | ---do--- | 0.08 | 0.04 | | Yes | 43.4 |
| 4A | ---do--- | 0.08 | | 0.03 | No | 13.6 |
| 4B | ---do--- | 0.08 | | 0.03 | Yes | 5.2 |
| 5A | ---do--- | 0.08 | | 0.01 | No | 34.8 |
| 5B | ---do--- | 0.08 | | 0.01 | Yes | 30.8 |
| 6B | acet | 0.11 | 0.04 | | Yes | 55.8 |
| 7B | ---do--- | 0.33 | 0.16 | | Yes | 64.2 |
| 8A | ---do--- | 0.08 | 0.04 | | No | 60.0 |
| 9 | ---do--- | 0.08 | 0.04 | | recomb | 54.8 |

In test 9, the precipitate was filtered and washed, and then the residue and filtrate were recombined and used as the flotation reagent, but the results were not substantially better than when the residue was used alone, as in test 1B. Tests were also run using the filtrates from the reagent combinations of tests 5B, 6B and 7B respectively as flotation reagents, but in no case was a measureable float produced.

It is noted from these tests that even with the acetate distinctly less useful results were obtained by separating the precipitate, and in the case of the hydrochloride a greatly inferior operation was obtained by such procedure and also by using sulfuric acid instead of a non-acidic reagent such as caustic or copper sulfate. Apparently, too, the amount of acid that can be used with the hydrochloride should be carefully determined; an excess is extremely deleterious, and contrary to what might be expected, the effect of the excess is not removed by washing it away (test 4B). A specific conclusion now drawn from the foregoing is that in processes of the type herein described the amine acetate is markedly and surprisingly superior to the other type of soluble amine, e. g. the hydrochloride, when presently preferred features of my invention are not wholly followed, the hydrochloride yielding poor or substantially inferior results where it was combined with sulfuric acid, or where its precipitate was separated and washed.

As a further example, satisfactory results in floating silica from phosphate have been obtained with a product called Rosin Amine D Acetate (Hercules Powder Co.), treated with a reagent such as zinc sulfate in accordance with the present invention.

Present experience indicates that for maximum efficiency, the preferred reagent preparation should be used quite promptly. For example, 5 cc. of 2½ per cent solution of octadecyl amine acetate were mixed and reacted with 1.7 cc. of 5 per cent solution of NaOH, and the mixture was allowed to stand in an open beaker for 72 hours. Five flotation tests were then run, each using about 500 grams of the deslimed Boyette ore. sample type II, $-\frac{1}{32}$ inch to +65 mesh, and ⅕ of the aged reagent mixture, equivalent to 0.112 lb./ton of the amine acetate at an am. ac. to NaOH ratio of 1:06. Results of the five tests were similar, yielding an average float of 175 grams per test. Following identical procedure, except that the reacted reagent mixture was allowed to stand for 72 hours in an air tight jar, another set of five flotation tests produced an average float of 210.2 grams per test. For comparison three similar flotations were run, using a freshly mixed preparation of the amine acetate and caustic soda, the feed and reagent quantities being identical with the previous operations. An average of 241.3 grams of silica was floated per test, thus demonstrating by comparison that under circumstances of an ordinary sort and even with amounts of the amine compound larger than those used in some other, successful examples of the invention, it is definitely detrimental to allow the reacted mixture to stand for a substantial period of time, e. g. even for a few days.

As intimated hereinabove, a matter of paramount importance in my improved reagent preparation process is that the reactant substances, such as amine acetate and caustic soda, be combined to form a precipitate prior to introduction into the feed pulp. This requirement is evidenced by the results of the following flotation tests X-1 to X-8, which in each instance were performed with a Fagergren flotation machine and with an amount and character of feed and with strengths of solutions of reagent ingredients identical to those employed in the tests itemized in Table 5 above. The particular reagents and operations used and the results obtained in the present tests were as follows:

Test X-1

Reagents: Pounds per ton dry feed
  Armour's AMAC-118.5 C _____ .08
  NaOH _____ .04
  Kerosene _____ .45

*Procedure.*—The flotation cell was half filled with dilute pulp, about 25% solids. Kerosene, amine acetate and caustic were added separately to the pulp. The flotation cell was then filled with water and flotation carried out.

Percent of feed floated as silica=1.0%
Percent of feed non-floated=99.0%

Test X-2

*Reagents.*—Same as in Test X-1.
*Procedure.*—The flotation cell was half filled with pulp as above. The reagents were added separately to a beaker containing 125 cc. of clear water. The water containing reagents was then washed into the flotation cell. The cell was filled with water and flotation was carried out.

Percent of feed floated as silica=5.0%
Percent of feed non-floated=95.0%

Test X-3

*Reagents.*—Same as in Test X-1.
*Procedure.*—The reagents were added separately to the feed pulp at about 70% solids and the pulp was then conditioned for 10 seconds in an agitator mixer. The conditioned pulp was washed into the flotation machine. The latter was filled with water and flotation carried out.

Percent of feed floated as silica=1.0%
Percent of feed non-floated=99.0%

Test X-4

*Reagents.*—Same as Test X-1, except that .2 lb. per ton of caustic was used.
*Procedure.*—Identical to Test X-3.
Percent of feed floated as silica=trace only.

Test X-5

*Reagents.*—Same as Test X-1.
*Procedure.*—The flotation cell was half filled with feed pulp. Kerosene was added. The amine acetate and caustic solutions were mixed together for 15 seconds and the resulting precipitate was washed into the feed pulp. The cell was filled with water and flotation carried out.

Percent of feed floated as clean silica=60.6%
Percent of feed non-floated=39.4%

Test X-6

*Reagents.*—Same as Test X-1.
*Procedure.*—Amine acetate and caustic were mixed together and washed into dewatered feed pulp. The pulp was then conditioned at 65 to 70% solids for 15 seconds in an agitator mixer. The conditioned pulp was washed into the flotation machine, kerosene was added, the cell was filled with water and flotation was carried out.

Percent of feed floated as silica=trace.

Test X-7

Reagents: Pounds per ton dry feed
  Armour's AMAC-1180-C _____ .08
  CuSO$_4$ _____ .02
  Kerosene _____ .45

*Procedure.*—Same as Test X-1.

Percent of feed floated as silica=trace.

Test X-8

*Reagents.*—Same as Test X-7.
*Procedure.*—Same as Test X-5.

Percent of feed floated as silica=48%.
Percent of feed non-floated=52%.

It will be apparent from these tests that in order to obtain the advantages of the described reagent preparation, the amine acetate and caustic, or other combination of reactants, must be mixed together prior to their addition to the feed pulp; nor were useful results obtained where the substances were added separately to a relatively large quantity of dilution water for the pulp (Test X-2). Indeed it can be inferred that when the reagents are for the first time combined or sought to be combined in the presence of the pulp or even in a state of extreme dilution (e. g. a dilution representing much less than ½ per cent solution of either reagent), the desired precipitation does not occur. Of course in substantially larger amounts free base amines and some soluble amine salts have heretofore been proposed as silica-floating reagents in pulps made alkaline by separate addition of caustic soda, but it is clear from the above tests that no precipitating reaction of the present sort could take place in such operations. Ordinarily even when used in the greater amounts, and at least unless the quantities are so large as to be commercially prohibitive in cost, amine materials so introduced for the treatment of phosphate ore yield flotation results to which the achievements of the present reagent preparation have been found distinctly superior, the difference being particularly marked in the case of soluble amine salts. These comparisons have been established by repeated tests with the Boyette type of feed herein described, which is a low grade material that has a tendency to produce slimes, and which is thus relatively poorly adapted to prior methods of silica flotation by cationic reagents.

Test X-6 (note also Tests X-3 and X-4) shows that so-called conditioning or other agitation of the feed pulp containing the prepared reagent was detrimental to the described operation. According to present belief, the effect of such agitation is probably to create slimes in the feed by breaking down the particle surfaces; the slimes then absorb at least much of the reagent, so that the flotation is less effective. It should be noted that there is considerable variation among phosphate materials intended as feed for concentration plants. Samples from some areas contain phosphate rock particles which are hard and brittle, and once deslimed, further agitation in an aqueous pulp does not break down the rock surfaces creating more slimes. Samples from other areas contain soft phosphate rock particles which continue to break down and create slimes almost as long as agitation is continued. Furthermore, the presence of caustic aggravates the sliming condition. In consequence, a special advantage of the present process is that no preliminary conditioning is required, or even desirable.

As evidence of independent utility of the reagent preparation and silica flotation procedure of the present invention, the following table summarizes tests made with the view of producing a marketable grade concentrate by silica flotation alone, from a Boyette prospect sample that comprised considerably less than usual of the soft rock. In these operations the feed particle size, strengths of reagent solutions, manner of combining and introducing reagents, and the flotation machine were the same as in other tests using the preferred procedure (cf. tests "A" of Table 5, and Test X-5 above). It will be noted that a high grade product was obtained using only 0.22 pound per ton of amine acetate.

it became balanced and continued to function without any fluctuations samples were taken of each product for a known time. These samples were dried, weighed and analyzed, and from such determinations the tonnage flow, reagent consumption and recoveries were calculated. The character of the feed and the various aspects and

TABLE 6

| Test No | | Y-9 | Y-10 | Y-11 |
|---|---|---|---|---|
| Reagents, lbs. per ton of dry feed | Armour's AMAC-118.5-C | 0.06 | 0.11 | 0.22 |
| | NaOH | 0.04 | 0.07 | 0.12 |
| | Kerosene | 0.45 | 0.45 | 0.45 |
| | B-23 alcohol (frother) | 0.07 | 0.07 | 0.14 |
| Feed | Per cent weight | 100.0 | 100.0 | 100.0 |
| | Assay, Per cent B. P. L | 26.43 | 26.02 | 26.21 |
| Float | Per cent weight | 61.5 | 68.0 | 70.8 |
| | Assay, Per cent B. P. L | 4.15 | 4.73 | 5.65 |
| Non-float discharge: i. e., concentrate | Per cent weight | 38.5 | 32.0 | 29.2 |
| | Grade: Per cent B. P. L | 62.02 | 71.25 | 76.07 |
| | Per cent Insol | 23.86 | 12.53 | 6.89 |
| | Per cent recovery (B. P. L.) | 90.3 | 87.6 | 84.7 |

By way of further example of the invention, the following is a brief description of pilot plant operations performed with a continuous feed of phosphate ore. The feed used consisted of Boyette washer debris, derived from a source similar to that of sample type I above, but of a somewhat higher grade. This material, as excavated from an exposed debris dam, was fed to a laboratory size Dorr Simplex rake classifier and sized on 65 mesh. The overflow containing 90% minus 65 mesh was discarded while the rake product containing 85.9% plus 65 mesh was hand screened on 14 mesh to remove the +14 mesh pebble and trash.

The −14 to +65 mesh material after being thoroughly mixed was used as the feed to a sand float circuit, from which the froth product went to waste, while the machine discharge; i. e. the non-floated portion, was pumped with a centrifugal pump to a feed bin. From the feed bin the material was fed at a constant rate to a table circuit for separation of a phosphate concentrate. The flotation circuit first mentioned also included a feed bin, delivering feed on a launder at a constant rate, to the flotation unit. The latter consisted of a two-cell minerals separation airflow machine. In the table circuit the material leaving the corresponding feed bin as underflow traversed a three-cell conditioner and was fed at a constant rate to a laboratory-size Deister table, delivering first and second concentrates. The table tailings were discharged to waste.

The reagents employed for the silica flotation comprised a combination of amine acetate and sodium hydroxide prepared in accordance with the preferred procedure. With the exception of this combination, all of the reagents were added to the feed in a manner understood to be regular and orthodox for the particular type of operating step concerned. The amine and caustic were added to a small agitator and received a short mixing time before being discharged into the feed as the latter traveled along the launder to the flotation unit. The distance of feed travel before it then reached the feed box of the flotation machine was very short.

The tabling reagents comprised sodium hydroxide, fuel oil and tall oil, and were added to the underflow from the table feed bin, so that thorough mixing of the reagents with the pulp was obtained in the conditioning step.

Operation of the system was started, and after results of the operations as determined from a representative set of samples taken when the system had been running for upwards of an hour and a half, were as set forth in the following table.

TABLE 7

*Simplex classifier rake product (feed to pilot plant)*

| Mesh | Per Cent Wt. | Per Cent BPL | Per Cent Insol. |
|---|---|---|---|
| Feed | 100.0 | 36.1 | 53.2 |
| +65 | 85.9 | | |
| −65 | 14.1 | | |

*Pilot plant metallurgical results*

AMINE FLOTATION CIRCUIT

| Products | Per Cent Wt. | Per Cent BPL | Per Cent Insol. |
|---|---|---|---|
| Feed¹ | 100.0 | 37.2 | |
| Float | 33.8 | 3.2 | |
| Non-float | 66.2 | 54.6 | 30.5 |

¹ Feed Rate 232.9 lbs./hr.

FATTY ACID TABLE CIRCUIT

| Products | Per Cent Wt. | Per Cent BPL | Per Cent Insol. | Per Cent Rec. |
|---|---|---|---|---|
| Feed² | 100.0 | 55.8 | | 100.0 |
| Conc-1 | 62.1 | 78.1 | 3.0 | 86.9 |
| Conc-2 | 6.1 | 76.9 | 4.3 | 8.4 |
| Tail | 31.8 | 8.3 | | 4.7 |

² Feed Rate 126.7 lbs./hr.

*Combined overall metallurgical results*

| Products | Per Cent Wt. | Per Cent BPL | Per Cent Insol. | Per Cent BPL Distribution |
|---|---|---|---|---|
| Feed | 100.0 | 38.1 | | 100.0 |
| Table Conc-1 | 41.1 | 78.1 | 3.0 | 84.3 |
| Table Conc-2 | 4.0 | 76.9 | 4.3 | 8.1 |
| Table Tail | 21.1 | 8.3 | | 4.7 |
| Amine F. P. | 33.8 | 3.2 | | 2.9 |
| T-C₁ and T-C₂ (total table conc.) | 45.1 | 78.0 | 3.1 | 92.4 |

*Combined overall metallurgical results*—Con.

| | Amine Sand Float, Total Feed | Fatty Acid Tabling | |
|---|---|---|---|
| | | Table Feed | Total Feed |
| AmAc 1180-C | 0.09 | | |
| Caustic | 0.03 | | |
| Kerosene | 0.09 | | |
| Caustic | | 0.5 | 0.3 |
| Fuel Oil | | 3.6 | 2.4 |
| Tall Oil Fatty Acid | | 3.6 | 2.4 |

It will be noted that the final combined table concentrate represented a high grade product and a good recovery of phosphate from the original feed. Delivery of the combined concentrate was at a rate of about 86.4 pounds per hour, for a table feed of 126.7 pounds per hour; comparison with the original feed rate of 232.9 pounds per hour indicates the distinct advantage of the process in providing, in effect, a great increase in the capacity of a recovery system that is essentially of the tabling type.

Pilot plant and other tests have been made wherein the phosphate-enriched discharge from a silica flotation according to the present invention was subjected to a froth flotation operation to separate a phosphate float, instead of a tabling operation. However in all such tests (where the original ore was of the low grades herein described, for which my complete process seems critically advantageous), the results were markedly inferior to those obtained with tabling, in one or usually more of such respects as grade, recovery and reagent consumption.

It should be seen from all of the foregoing that the improved steps and procedures are capable of use under a variety of circumstances for the improvement of phosphate recovery operations, particularly with respect to economy of reagent costs, increase of tonnage capacity of a given system (such as a tabling plant), and improvement in grade and recovery of the final concentrate. The described reagent preparation preferred for silica flotation in accordance with the present invention represents a marked saving of expensive reagents, as well as improvement in actual separating function, i. e. as to quantity of silica removed. It will be understood that unless otherwise specified the term "silica" is used hereinafter in the appended claims in a generic sense, to mean not only $SiO_2$ (or quartz) but also other silicious materials, e. g. silicates (that can be chemically measured as silica), which may accompany phosphate mineral and toward which amine reagents, according to the understanding of the art, can be expected to behave in the same way, i. e. if treated by my process.

It will be appreciated that the amount of amine material to be used in a given operation is governed by the circumstances of the latter, e. g. the nature and grade of the feed, its particle size characteristics, its tendency to form slimes, and the like. In general, for low grade ores of the type specifically mentioned above, assaying not more than 35 or 36 per cent B. P. L. and often considerably less, it appears that a material such as octadecyl amine acetate will produce very satisfactory results in an amount of 0.06 to 0.10 pound per ton of feed, where the silica flotation is performed as a preliminary to a phosphate concentrating operation, i. e. by tabling, excellent results being usually had with 0.08 to 0.09 pound per ton. In some cases, where a particularly low grade feed is to be handled, or where a more thorough removal of silica is contemplated, amounts of the amine acetate up to 0.12 pound per ton, or even somewhat more, may be employed, 0.12 pound per ton appearing to be about the largest amount necessary under any circumstances with pulps of the sort here considered.

As indicated above, where the silica flotation may be used by itself to obtain a marketable phosphate product, the quantity of reagent can be economically increased, say to something more than 0.2 pound per ton, but it usually need be no greater than about 0.25 pound per ton, provided excessive amounts of coarse sand or slime producing particles are not present in the feed.

The cooperating reagent, such as caustic soda, is preferably used in amount (anhydrous weight) of $\frac{1}{3}$ to $\frac{2}{3}$ that of the amine acetate; but where necessary, larger quantities of caustic can usually be employed, since this is a relatively inexpensive substance. Supplemental reagents such as kerosene or additional frothers can be incorporated in amounts suitable to their function, these again being relatively inexpensive materials. The strengths of the solutions in which the amine salt and cooperating reactant are preferably established for effecting the precipitating reaction may vary within reasonable limits, i. e. above a deleteriously extreme dilution as mentioned hereinabove, and below an upper limit fixed by the solubility of the salt or reactant and by the ease of handling the precipitated mixture, i. e. in that there should be enough dilution to keep the precipitate from rendering the mixture excessively viscous or sticky. For example, amine acetate solutions of 2½ per cent to 5 per cent appear suitable, and correspondingly, sodium hydroxide solutions of 5 per cent to 10 per cent.

It does not appear that the pH of the feed pulp is critical when the preferred reagent combination is used; that is to say, nothing appears to be gained, for example, by separately introducing caustic or other alkali to provide a high pH value, as has sometimes been desired in prior operations with amine type reagents. In the various tests described above, the feed pulps, before or after addition of the reagents, have had a pH of approximately 7, and variations from approximate neutrality due to the use of the described reagents, e. g. whether alkali or acid is used as the cooperating reactant, seemed to be unimportant.

As already stated, the reagent preparation involves mixing the amine acetate and caustic or other combination together before introduction into the feed pulp, the period of mixing amounting usually to one or two minutes, although longer periods may be employed without undesirable effect. The resulting precipitate is insoluble in water and seems to have about the same specific gravity as water. It usually constitutes a fine dispersion, part sinking, part in suspension, and part floating. Supplemental material such as kerosene can be introduced into the amine mixture, or separately into the flotation circuit either before or after the amine reagent. Although the precipitated reagent may usually be introduced into the feed pulp before it enters the cell, it can be added to the material in the cell directly, as at a locality remote from the overflow and discharge points. The precipitate can be incorporated in feed pulp varying from 5 per cent to 85 per cent solids without much effect on the effectiveness of the reagent; necessary dilution of a thick pulp can, if desired, be achieved by adding water to the cell after the reagent is introduced. It seems extremely desirable, however, that both the feed pulp and the dilution water be practically free of slimes.

A special advantage of the preferred reagent, in contrast to free base amines, resides in the fact that the latter are both difficult and dangerous to handle. The free amines adhere very readily to glass and certain metals and consequently their use in a flotation plant presents serious handling and cleaning problems, e. g. in fouling and clogging of reagent feed equipment. Furthermore, the free amines are rather strong bases and can cause severe burns to operating personnel, their poisonous character apparently having in some cases even a cumulative effect.

The amine acetates and like soluble amines are not characterized by either of these disadvantages, and hence the present process reduces such difficulties to a minimum, since even if the precipitate constitutes a free amine, it is in effect consumed at once in the flotation circuit, without handling.

I claim:

1. A method of subjecting phosphate mineral in a silica-containing ore to concentration by a tabling operation, said ore having a grade of not more than 38 per cent B. P. L. and being divisible into fractions of larger and smaller particle sizes respectively, and said smaller particle size fraction being at least about 50 per cent of the ore and having a grade of less than about 30% B. P. L., comprising converting the ore into a table feed having a grade of at least about 45% B. P. L. by chemically precipitating, in finely dispersed form and in an aqueous medium, an insoluble, silica-floating amine material from a soluble salt of an amine containing 8 or more carbon atoms, thereafter and before the silica-floating property of said precipitate is materially impaired, introducing said precipitated amine material into a pulp of the ore while said precipitate remains in fine, undissolved form in an aqueous medium and while it is finely dispersed in an aqueous medium, and subjecting said pulp to flotation to separate a silica float leaving a phosphate-enriched, non-floated portion as said table feed, and subjecting said non-floated portion to a tabling operation in the presence of a phosphate-selective reagent, to produce a phosphate concentrate having a grade higher than about 70% B. P. L.

2. A method of subjecting phosphate mineral in a silica-containing ore to concentration by a tabling operation, said ore having a grade not substantially higher than about 35% B. P. L. and being divisible into minor and major fractions of larger and smaller particle sizes respectively, and said major fraction having a grade not substantially higher than about 25% B. P. L., comprising converting the ore into a table feed having a grade of at least about 45% B. P. L. by introducing an insoluble, silica-floating amine reagent that is distributed in a liquid vehicle, into a pulp of the ore and subjecting the pulp to flotation to separate a silica float leaving a phosphate-enriched, non-floated portion as said table feed, said phosphate-enriched non-floated portion being obtained with a recovery therein of at least 90% of the B. P. L. content of the aforesaid ore, and subjecting said non-floated portion to a tabling operation in the presence of a phosphate-selective reagent, to produce a phosphate concentrate having a grade of at least about 75% B. P. L.

3. A method of subjecting phosphate mineral in a silica-containing ore to concentration by a tabling operation, said ore having a grade of not more than 38 per cent B. P. L. and being divisible into fractions of larger and smaller particle sizes respectively, and said smaller particle size fraction being at least about 50 per cent of the ore and having a grade of less than about 30% B. P. L., comprising converting the ore into a table feed having a grade higher than about 40% B. P. L. by subjecting the ore to flotation in the presence of a silica-floating amine reagent to separate a silica float leaving a phosphate-enriched, non-floated portion as said table feed, said phosphate-enriched non-floated portion being obtained with a recovery therein of at least 90% of the B. P. L. content of the aforesaid ore, and subjecting said non-floated portion to a tabling operation in the presence of a phosphate-selective reagent, to produce a phosphate concentrate having a grade higher than about 70% B. P. L.

4. In a method of concentrating phosphate mineral in a predetermined quantity of silica-containing ore which has a grade not substantially higher than about 35% B. P. L. and which has a predetermined particle size range suitable for wet concentration operations with selective reagents, said ore having its phosphate content decreasing with decrease of particle size within said range, a major part of said ore being in the finest particle sizes thereof and having a grade of less than 25% B. P. L., the procedure of subjecting nearly all of the phosphate content of said ore to a concentrative tabling operation while providing feed to said tabling operation in an amount equal to less than about 60 per cent of the aforesaid predetermined quantity, comprising converting said ore into said table feed of reduced amount by introducing a silica-floating amine reagent into a pulp of the total predetermined quantity of ore and subjecting the pulp to flotation in presence of said reagent to separate a silica float grading less than 10% B. P. L., leaving a phosphate-enriched non-floated portion as said table feed, said phosphate-enriched non-floated portion being obtained with a recovery therein of at least 90% of the B. P. L. content of the aforesaid ore, and subjecting said non-floated portion to the tabling operation in the presence of a phosphate-selective reagent to produce a phosphate concentrate having a grade higher than about 70% B. P. L.

5. In a method of concentrating phosphate mineral in a predetermined quantity of comminuted, silica-containing ore which has a grade of less than about 40% B. P. L. and which has a predetermined particle size range suitable for wet concentration operations with selective reagents, said ore having its phosphate content decreasing with decrease of particle size within said range, the procedure of subjecting nearly all of the phosphate content of said ore to a concentrative tabling operation while providing feed to said tabling operation substantially less in amount than the aforesaid predetermined quantity, comprising converting said ore into said table feed of reduced amount by chemically precipitating, in an aqueous medium, an insoluble, finely divided silica-floating amine material from a soluble salt of an amine containing 8 or more carbon atoms, thereafter and before the silica-floating property of said precipitate is materially impaired, introducing said precipitated amine material, in said medium, while it remains in finely divided, undissolved form into a pulp of the ore, and subjecting said pulp to flotation to separate a silica float leaving a phosphate-enriched, non-floated portion as said table feed, and subjecting said non-floated portion to a tabling operation in the presence of a phosphate-selective reagent, to produce a phosphate concentrate.

6. In a method of concentrating phosphate mineral in ore containing silica, the steps of chemically precipitating, in an aqueous medium, an insoluble, finely divided silica-floating amine material from a soluble salt of an amine containing 8 or more carbon atoms, thereafter and before the silica-floating property of said precipitate is materially impaired, introducing said precipitated amine material, while it remains in undissolved, finely divided form in said medium, into a pulp of the ore, and subjecting said pulp to flotation to separate a silica float leaving a phosphate-enriched, non-floated portion.

7. In a method of concentrating phosphate mineral in ore containing silica, the steps of preparing a silica-floating reagent by reacting in an aqueous medium an acetate of a primary aliphatic amine comprising a carbon group having 16 to 22 carbon atoms, with sodium hydroxide to precipitate said amine as a free base amine, immediately introducing said precipitate, while carried in undissolved, finely divided form in said aqueous medium, into a pulp of the aforesaid ore, and immediately and without intermediate agitation subjecting the pulp to flotation operation to separate a silica float leaving a phosphate-enriched, non-floated portion of the pulp.

8. In a method of concentrating phosphate mineral in ore containing silica, the steps of chemically precipitating, in an aqueous medium, an insoluble, finely divided silica-floating amine material from a soluble salt of an amine containing at least 16 carbon atoms introducing said precipitated amine material, while it remains in undissolved, finely divided form in said medium and before its silica-floating property is materially impaired, into a pulp of the ore, and subjecting said pulp to flotation operation to separate a silica float leaving a phosphate-enriched, non-floated portion of the pulp.

9. In a method of concentrating phosphate mineral in comminuted ore that contains silica and that in pulp form, even if deslimed, is adapted to produce slimes upon agitation, the steps of chemically precipitating, in finely divided form and in an aqueous medium, an insoluble, silica-floating amine material from a soluble salt of an amine containing 8 or more carbon atoms, thereafter and before the silica-floating property of said precipitate is materially impaired, introducing said precipitated amine material into a substantially slime-free pulp of said ore, said precipitated amine material being so introduced while it remains in undissolved, finely divided form and in an aqueous medium, and immediately and without intermediate agitation subjecting the pulp to flotation operation to separate a silica float leaving a phosphate-enriched, non-floated portion of the pulp.

10. In a method of concentrating phosphate mineral in ore that contains silica and that has a grade not substantially higher than about 35% B. P. L., the procedure of converting the ore into an enriched material that contains nearly all of the phosphate in the ore and that has a grade expressed in percentage B. P. L. higher by at least about twenty than the B. P. L. percentage of the original ore, by chemically precipitating, in an aqueous medium, an insoluble, finely divided silica-floating amine material from a soluble salt of an amine containing 8 or more carbon atoms, thereafter and before the silica-floating property of said precipitate is materially impaired, introducing said precipitated amine material, while it remains in undissolved finely divided form in said medium, into a pulp of the ore, said amine material being introduced in an amount corresponding to less than about 0.12 pound of the soluble amine salt from which it is made, per ton of the dry weight of ore in the pulp, and subjecting the pulp to flotation operation to separate a silica float leaving a non-floated portion constituting said enriched material.

11. The procedure recited in claim 10 wherein the amine salt is an acetate of an amine comprising a group of at least 16 carbon atoms and wherein the amine material is introduced in the pulp in amount corresponding to about 0.06 to 0.10 pound of said acetate per ton of ore.

12. In a method of concentrating phosphate mineral in silica-containing ore, the steps of preparing a reagent adapted to promote selective flotation of the silica in a pulp of said ore, comprising reacting an acetate of an amine having a composition containing 8 to 22 carbon atoms and characteristic of a silica-floating amine reagent, in an aqueous medium, with sodium hydroxide, to produce a diffuse precipitate of a free base amine having the aforesaid composition, in said aqueous medium, thereafter and before the silica-floating property of said precipitate is materially impaired and while said precipitate remains in undissolved form and is carried in diffuse form in an aqueous medium, introducing said precipitate into a pulp of the ore, and subjecting said pulp to a flotation operation to separate a silica float leaving a phosphate-enriched, non-floated portion of the pulp.

13. In a method of concentrating phosphate mineral in ore containing silica, the steps of preparing a silica-floating reagent by reacting in an aqueous medium a soluble salt of an amine having a composition containing 8 to 22 carbon atoms and characteristic of a silica-floating amine reagent, with a soluble reactant adapted to convert said amine salt into an insoluble silica-floating amine reagent which consists of an insoluble compound comprising said amine, to produce a diffuse, finely divided precipitate of said compound, said soluble reactant being selected from the class consisting of strongly alkaline reagents and reagents containing the anion of an oxygen-containing acid, said acid being of the class consisting of aliphatic carboxylic, oxidized sulfur and oxidized phosphorus acids, immediately introducing said precipitate while carried in said aqueous medium, into a pulp of the aforesaid ore, and immediately and without intermediate agitation subjecting the pulp to flotation operation in the presence of kerosene to separate a silica float leaving a phosphate-enriched, non-floated portion of the pulp.

14. In a method of concentrating phosphate mineral in ore containing silica, the steps of chemically precipitating, in an aqueous medium, a finely divided, insoluble, silica-floating amine material from an acetate of an amine containing 8 or more carbon atoms, thereafter and before the silica-floating property of said precipitate is materially impaired, and while said precipitate remains in undissolved, finely divided form and is carried in an aqueous medium, introducing said precipitated amine material into a pulp of the ore, and subjecting said pulp to a flotation operation to separate a silica float leaving a phosphate-enriched, non-floated portion of the pulp.

15. In a method of concentrating phosphate mineral in ore containing silica, the steps of chemically precipitating, in an aqueous medium, a finely-divided, insoluble, silica-floating amine material from a soluble salt of an amine containing 8 or more carbon atoms, thereafter and before the silica-floating property of said precipitate is materially impaired, and while said precipitate remains in undissolved, finely divided form and is carried in an aqueous medium, introducing said precipitated amine material into a pulp of the ore, and subjecting said pulp to a flotation operation to separate a silica float leaving a phosphate-enriched, non-floated portion of the pulp.

16. In a method of concentrating phosphate mineral in ore containing silica, the steps of preparing a silica-floating reagent by reacting in an aqueous medium a soluble salt of an amine having a composition containing 8 to 22 carbon atoms and characteristic of a silica-floating amine reagent, with a soluble hydroxide adapted to convert said amine salt into an insoluble silica-floating amine reagent consisting of the corresponding free base amine, to produce a diffuse, finely divided precipitate of said free base amine, immediately introducing said precipitate while carried in said aqueous medium, into a pulp of the aforesaid ore, and immediately and without intermediate agitation subjecting the pulp to flotation operation in the presence of kerosene to separate a silica float leaving a phosphate-enriched, non-floated portion of the pulp.

17. In a method of concentrating phosphate mineral in ore containing silica, the steps of preparing a silica-floating reagent by reacting in an aqueous medium a soluble salt of an amine having a composition containing 8 to 22 carbon atoms and characteristic of a silica-floating amine reagent, with a soluble reagent containing sulfate ion and adapted to convert said amine salt into an insoluble silica-floating amine reagent consisting of an insoluble amine salt, to produce a diffuse, finely divided precipitate of said insoluble amine salt, immediately introducing said precipitate while carried in said aqueous medium, into a pulp of the aforesaid ore, and immediately and without intermediate agitation subjecting the pulp to flotation operation in the presence of kerosene to separate a silica float leaving a phosphate-enriched, non-floated portion of the pulp.

ROBERT D. EVANS.

REFERENCES CITED

The following references are of record in the file of this patent:

UNITED STATES PATENTS

| Number | Name | Date |
|---|---|---|
| 2,222,728 | Tartaron | Nov. 26, 1940 |
| 2,343,221 | Maust | Feb. 29, 1944 |

OTHER REFERENCES

Richter's Organic Chemistry, vol. 1, 2nd ed., page 157.